No. 725,775. PATENTED APR. 21, 1903.
C. G. RICHARDSON.
BACK REST FOR TURRET LATHES.
APPLICATION FILED OCT. 31, 1902.
NO MODEL. 2 SHEETS—SHEET 1.
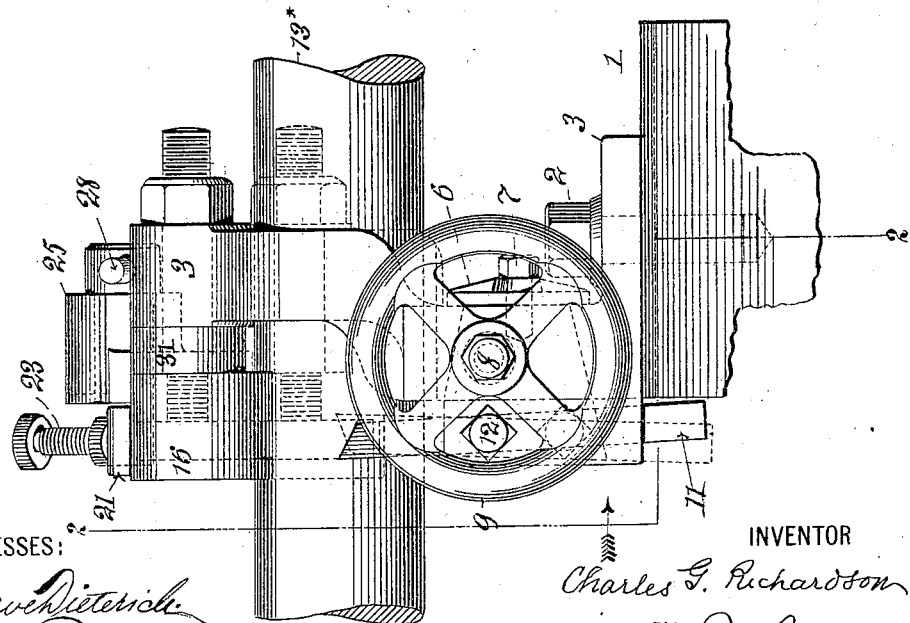
WITNESSES:
Gustave Dieterich
J. A. Van Wart
INVENTOR
Charles G. Richardson
BY
ATTORNEY No. 725,775. PATENTED APR. 21, 1903.
C. G. RICHARDSON.
BACK REST FOR TURRET LATHES.
APPLICATION FILED OCT. 31, 1902.
NO MODEL. 2 SHEETS—SHEET 2.
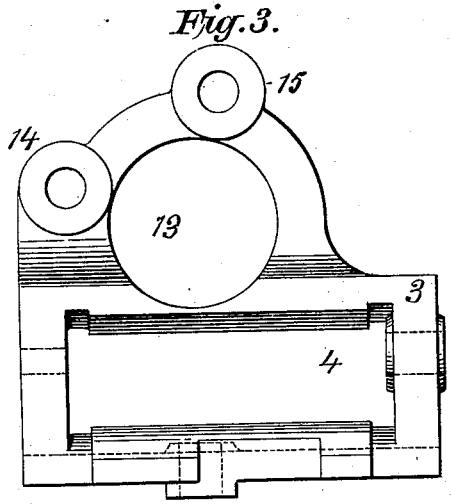
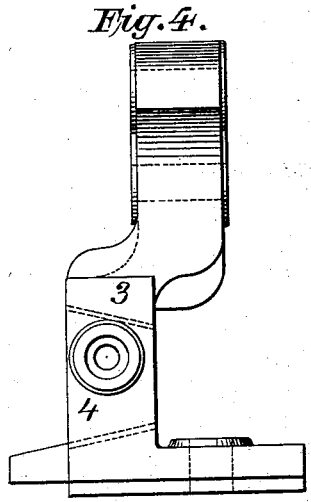
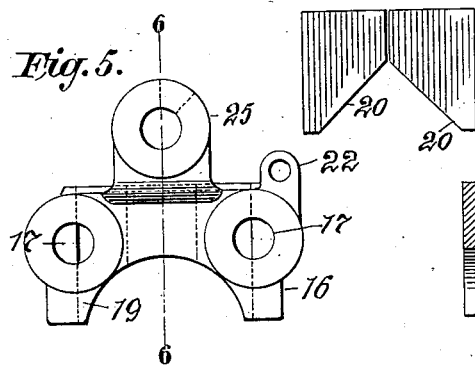
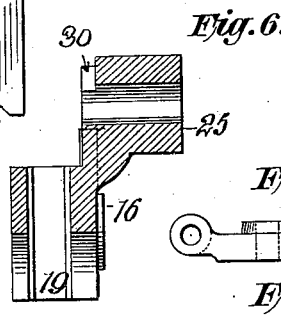
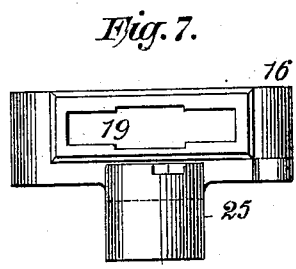
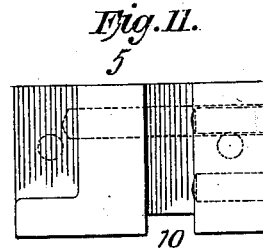
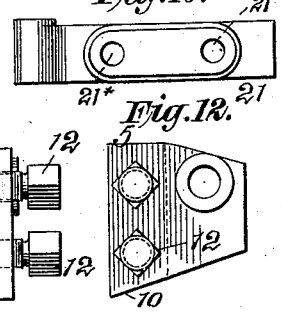
WITNESSES:
Gustave Dieterich
J. A. Van Wart
INVENTOR
Charles G. Richardson
BY
his ATTORNEY

UNITED STATES PATENT OFFICE.

CHARLES G. RICHARDSON, OF SPRINGFIELD, VERMONT, ASSIGNOR TO DE LAVAL STEAM TURBINE COMPANY, A CORPORATION OF NEW JERSEY.

BACK-REST FOR TURRET-LATHES.

SPECIFICATION forming part of Letters Patent No. 725,775, dated April 21, 1903.

Application filed October 31, 1902. Serial No. 129,545. (No model.)

*To all whom it may concern:*

Be it known that I, CHARLES G. RICHARDSON, of Springfield, Windsor county, Vermont, have invented a new and useful Improvement in Back-Rests for Turret-Lathes, of which the following is a specification.

The object of the invention is to provide a back-rest for turret-lathes which can be adapted once for all for any given class of work to be operated upon or, in other words, which will remain in adjustment, although its pressure on the work may be relaxed after each successive operation. My device is also constructed so that the rest can be placed either to follow or precede the tool during the movement of the tool toward or from the chuck.

In the accompanying drawings, Figure 1 is a side elevation of my improved back-rest. Fig. 2 is a vertical section on the line 2 2 of Fig. 1 viewed in the direction of the arrow. Fig. 3 is an end view, and Fig. 4 a side view, of the tool-block support. Fig. 5 is a side view. Fig. 6 is a section on the line 6 6 of Fig. 5, and Fig. 7 is a top view showing the back-rest holder. Fig. 8 shows the back-rest jaws separately. Fig. 9 is a side view, and Fig. 10 a top view, of the holding-plate for said jaws. Fig. 11 is a side view, and Fig. 12 is an end view, of the sliding tool-block. Fig. 13 is a face view of the gib-plate for holding the tool-block in its support.

Similar numbers of reference indicate like parts.

1 represents a part of a tool-carrier of a turret-lathe. This tool-carrier may be of any desired form or construction, the portion here shown at 1 being a part of the carrier-ring represented in United States Patent No. 481,717, granted to me August 30, 1892.

Secured upon the face of the carrier 1 by means of the bolt 2 is a tool-block support 3, Figs. 3 and 4, which in its lower portion has a tapered opening 4, in which is inserted the sliding tool-block 5, Figs. 11 and 12. The tool-block 5 is secured in place by means of the gib-plate 6, Fig. 13, which bears against the support 3 and projects on each side of and beyond the opening therein. This gib is secured to the tool-block 5 by means of screws 7, Figs. 1 and 2. The tool-block 5 is thus held in the opening 4; but it is free to slide longitudinally therein. The longitudinal movement of said tool-block is effected by means of the screw 8, actuated by the hand-wheel 9, and its extent of movement may be limited by the screw-stop 8*. In said tool-block, Fig. 11, is a vertical recess 10 to receive the tool 11, and the tool is clamped in this recess by means of two set-screws 12, Figs. 11 and 12. In the upper part of the support 3 is an opening 13, through which passes the shaft 13*, which is to be turned. Above this opening are two cylindrical lugs 14 15, having let-through holes by means of which the back-rest holder 16 is secured in place. The back-rest holder 16, which is represented in Figs. 5, 6, and 7, has holes 17, which are threaded to receive the ends of the fastening-bolts. Extending downwardly through the back-rest holder is a recess or slot 19, Figs. 6 and 7, into which are inserted the two jaws 20. (Shown in Fig. 8.) When these jaws are in place, they rest upon the work, as shown in Fig. 2. Disposed above them is a pivoted plate 21, Figs. 9 and 10, the pivot of which is secured to the lug 22, Fig. 5, on the back-rest holder. Two set-screws 23, Fig. 2, are received in threaded openings 21* in plate 21 and bear upon the backs of the two jaws 20. The set-screws 23 are provided with lock-nuts 24 for the purpose hereinafter stated. On the rest-holder, Fig. 5, is a lug 25, which has an opening to receive a cam-shaft 26. The eccentric portion of the shaft (shown at 27) bears upon the pivoted plate 21. The shaft is provided with a working handle 28, and there is also a pin 29 on said eccentric. Fig. 2 shows the eccentric as forced down, holding the points of the screws 23 firmly against the backs of the jaws 20.

The operation of the device as so far described is as follows: Let it be assumed that the lathe is to reproduce the same piece of work an indefinite number of times. When the first piece of work is adjusted in the chuck, the jaws 20 are inserted in the recess 19 in their holder, so as to bear upon the work-surface. The plate 21 is brought down and clamped in position by means of the eccentric 27, and then the adjusting-screws 23 are set downward to force the jaws against the work with the required amount of pressure.

The screws 23 are then secured as adjusted by the jam-nuts 24. The first piece of work is then finished. In order to remove it from the lathe, it is necessary to relax the pressure of the jaws. This is done without affecting the adjustment of the jaws which has been made by the screws 23 by raising the handle 28, so as to relieve the pressure of the eccentric on plate 21. The old piece of work is then removed and a new piece of work inserted and the pressure of the eccentric again applied by bearing down upon the handle 28 and a second piece of work turned, and so on indefinitely without any readjustment of the set-screws 23, which, as already stated, determine the position of the jaws 20 with respect to the work. So far as I know this is an entirely new feature in back-rests for lathes of this description, and it is to be understood that I do not limit myself to the specific means for accomplishing the result stated, but desire my hereinafter claims to be construed as broadly covering any means for maintaining the adjustment of the jaws despite their frequent release.

When it is desired to remove the jaws 20 from their holder, I raise the handle 28 sufficiently to allow the pin 29 of the eccentric to enter a radial slot 30, Figs. 2 and 6, formed on the face of the lug 25, and this allows the eccentric to be retracted sufficiently to permit the cover-plate 21, and with it of course the set-screws 23, to be raised, and so allow access to the rest-jaws. The object of the pin 29 is simply to prevent the operator from pulling the eccentric shaft out of its bearing.

It is sometimes necessary in employing a rest of this description to so dispose the rest-jaws as that they shall precede the turning-tool in its motion toward or from the chuck and sometimes so that they shall be in rear of it. In the first case they of course rest upon the surface which has not been subjected to the action of the tool, and in the second case they rest upon the surface which has been already turned. Any person skilled in the art will readily understand the conditions under which either of these arrangements is to be adopted. One means of accomplishing this here shown consists in introducing between the rest-holder 16 and the tool-block support 3 a suitable washer or washers, as represented at 31 in Fig. 1. The thickness of the washer or washers is to be such as to displace the rest the proper amount with reference to the tool-point. Thus in Fig. 1 the position of the rest shown in dotted lines considered with reference to the tool indicated in full lines is such that the rest-jaws practically follow the tool, the feeding being from right to left of the drawing. The same result happens when the position of the tool is as shown in dotted lines, the feed being then from left to right of the drawing. It will be understood that by putting in more or less washers, as 31, the rest-jaws can be adjusted either in advance or in rear of the tool.

I claim—

1. The combination with a tool-holder, of a back-rest holder thereon, a back-rest jaw mounted to move freely in said back-rest holder, a plate movably mounted on said back-rest holder to force the jaw against the work, a set-screw mounted on the plate and engaging the outer edge of the back-rest jaw, and manually-operated means for pressing the plate and its screw toward the said jaw or releasing it, substantially as set forth.

2. The combination with a tool-holder, of a back-rest holder having an open recess, back-rest jaws sliding in said recess, a cover-plate at the outer end of said recess, set-screws passed through said cover-plate into engagement with the outer ends of said jaws, and a manually-operated pressure device engaging the said cover-plate to vary the pressure of the screws on the jaws, substantially as set forth.

3. The combination with a tool-holder, of a back-rest holder mounted on the face of the tool-holder, means for spacing or adjusting the back-rest holder from the tool-holder and across the plane of the tool, substantially as set forth.

4. The combination with a tool-holder provided with an opening for the work, of a back-rest mounted on the tool-holder and adjustable transversely toward the work-opening and also adjustable in the direction of the longitudinal axis thereof and across the plane of the tool, and devices for effecting said adjustments, substantially as set forth.

5. The combination with a tool-holder having a work-opening and a tool-carrier adjustable transversely with respect to said opening, of a back-rest adjustable transversely with respect to said opening and also adjustable toward and from the face of the tool-holder or in the direction of the longitudinal axis of said opening and devices for effecting said adjustments.

6. The combination with a tool-holder provided with a work-opening, of a back-rest holder adjustable toward and from the face of the tool-holder, means for so adjusting it, back-rest jaws movable transversely toward and from the said opening, a cover-plate provided with screws engaging the outer edges of the said jaws and a cam for adjusting the cover-plate, substantially as set forth.

7. In a back-rest for turret-lathes, the combination of the tool-block support 3 having work-opening 13, sliding tool-block 5 therein, rest-jaw holder 16 supported on said tool-block, jaws 20 in said holder, and means for varying the distance between said jaw-holder 16 and said tool-block support 3 and hence the distance between said jaws and said tool in the direction of the axis of rotation of the work, substantially as described.

8. In a back-rest for turret-lathes, the combination of a tool-support 3, rest-jaw holder 16 on said support 3, jaws 20 in said holder and means for adjusting the proximity of said holder to said support and thereby determining the interval between said rest and said tool in the direction of the axis of rotation of the work, substantially as described.

9. The combination with the tool-holder provided with a work-opening, of a back-rest holder mounted on the tool-holder, back-rest jaws mounted in said back-rest holder, a cover-plate provided with independent adjusting devices engaging the outer edges of the jaws, a bearing on the back-rest having a radial slot, a longitudinally-movable eccentric mounted in said bearing, engaging the cover-plate and provided with an operating-handle and with a stop-pin adapted to enter said radial slot, substantially as set forth.

10. A back-rest holder having a recess or socket, back-rest jaws mounted therein, a pivoted cover-plate having adjustable screws engaging the outer ends of the jaws, and an eccentric mounted on the holder and engaging the upper side of the cover-plate, substantially as set forth.

11. The combination with a tool-holder having a work-opening and an offset extension, and bolt-openings in said extension, of a back-rest holder, having bolts extending through said bolt-openings and washers on the bolts between said extension and the back-rest holder, whereby the holder may be adjusted across the plane of the tool, substantially as set forth.

12. The combination with the tool-holder having a work-opening, a recess or guideway therebelow and bolt-openings at the opposite side of the work-opening, and a tool-carrier mounted adjustably in said recess or guideway, of a back-rest holder having bolts extending through said bolt-openings, back-rest jaws, a cover-plate having screws engaging the outer ends of said jaws, and an eccentric engaging the cover-plate, substantially as set forth.

In testimony whereof I have signed my name to this specification in the presence of two subscribing witnesses.

CHARLES G. RICHARDSON.

Witnesses:
 WM. H. SIEGMAN,
 I. A. VAN WART.